(12) United States Patent
Palalau

(10) Patent No.: US 6,271,813 B1
(45) Date of Patent: *Aug. 7, 2001

(54) VOLTAGE CONTROL FOR ADJUSTING THE BRIGHTNESS OF A SCREEN DISPLAY

(75) Inventor: Silviu Palalau, Birmingham, MI (US)

(73) Assignee: Lear Automotive Dearborn, Inc., Southfield, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/705,613

(22) Filed: Aug. 30, 1996

(51) Int. Cl.$^7$ ........................................................ G09G 3/30
(52) U.S. Cl. ............................. 345/77; 345/63; 345/207; 345/214
(58) Field of Search ................................. 345/20, 63, 77, 345/147, 205, 76–81, 90, 207, 214

(56) References Cited

U.S. PATENT DOCUMENTS

| | | |
|---|---|---|
| 3,761,617 | 9/1973 | Tsuchiya et al. . |
| 3,975,661 | 8/1976 | Kanatani et al. . |
| 4,358,713 | 11/1982 | Senoo et al. . |
| 4,514,727 | 4/1985 | Van Antwerp . |
| 4,760,389 * | 7/1988 | Aoki et al. ............................ 345/207 |
| 5,057,744 | 10/1991 | Barbier et al. . |
| 5,059,957 * | 10/1991 | Todoriki et al. .......................... 345/7 |
| 5,093,654 * | 3/1992 | Swift et al. ............................. 345/76 |
| 5,270,818 | 12/1993 | Ottenstein . |
| 5,406,305 * | 4/1995 | Shimomura et al. ................... 345/63 |
| 5,717,417 * | 2/1998 | Takahashi ............................. 345/147 |
| 5,760,760 * | 6/1998 | Helms .................................... 345/63 |
| 5,786,801 * | 7/1998 | Ichise .................................... 345/102 |
| 5,952,992 * | 9/1999 | Helms .................................... 345/102 |
| 6,052,118 * | 4/2000 | Beeteson et al. ..................... 345/207 |
| 6,069,598 * | 5/2000 | Hansen .................................. 345/74 |
| 6,078,302 * | 6/2000 | Suzuki ................................... 345/77 |

FOREIGN PATENT DOCUMENTS

| | | |
|---|---|---|
| 0238799A2 | 1/1987 | (EP) . |
| 0595792A2 | 12/1988 | (EP) . |
| 0391755A2 | 3/1990 | (EP) . |
| 0679549A1 | 2/1995 | (EP) . |
| 2285329A | 12/1994 | (GB) . |

OTHER PUBLICATIONS

IBM Technical Disclosure Bulletin, vol. 29, No. 3, Aug. 1986—"Comprehensive Luminance Control Fro Electroluminescent Display Monitors".

PCT Search Report dated Jan. 22, 1998 for International Application No. PCT/US97/14606 filed on Aug. 19, 1997.

* cited by examiner

Primary Examiner—Almis R. Jankus
Assistant Examiner—Henry N. Tran
(74) Attorney, Agent, or Firm—Niro, Scavone, Haller & Niro

(57) ABSTRACT

A method of controlling the brightness level of a screen display having a matrix of pixels that each have a brightness level controlled by a first and second voltage includes maintaining the first voltage of each pixel at a preselected voltage level. The second voltage level is controlled and adjusted depending on the ambient light conditions. The second voltage is increased during daytime conditions to increase the brightness of the screen display and decreased during nighttime conditions to decrease the brightness of the display. The ambient light conditions are determined by using a light-sensitive sensor or a manually adjustable control.

14 Claims, 2 Drawing Sheets

VOLTAGE CONTROL FOR ADJUSTING THE BRIGHTNESS OF A SCREEN DISPLAY

BACKGROUND OF THE INVENTION

This invention relates to a method of controlling the brightness of a screen display in response to changing environmental light conditions.

A variety of electronic screen displays are commercially available. As a result of improvements in technology, screen displays are being used for an increasing variety of applications. Some of those applications result in the screen display being used under a variety of environmental conditions. One example is having a visual screen display mounted within an automobile. A driver's or passenger's ability to view the screen while traveling in a vehicle is affected by the outside light conditions, for example. Different levels of screen brightness are required during daytime hours as compared to nighttime hours. Accordingly, there is a need for an efficient and relatively simple way of adjusting the brightness of a screen display in response to environmental light conditions.

This invention provides a method of adjusting the brightness of a screen display depending on ambient light conditions. The method of this invention can be implemented through software or relatively simple dedicated circuitry that can be included with a screen display control.

SUMMARY OF THE INVENTION

In general terms, this invention is a method of controlling the brightness level of a screen display having a matrix of screen pixels that each has a brightness level controlled by a first and a second voltage level. The method includes five basic steps. First, maintaining the first voltage of each pixel at a preselected voltage level. Second, a current screen display brightness level is determined. The next step is to determine an ambient light condition. The current brightness level is then compared to a desired brightness level that corresponds to the determined ambient light condition. Lastly, the second voltage of each pixel is adjusted when the current brightness level does not correspond to the desired brightness level so that the brightness level of the screen display is adjusted and corresponds to the desired brightness level, given the current ambient light conditions.

Various features and advantages of this invention will become apparent to those skilled in the art from the following detailed description of the preferred embodiment. The drawings that accompany the detailed description can be described as follows.

DETAILED DESCRIPTION OF THE PREFERRED EMBODIMENT

Figure 1:
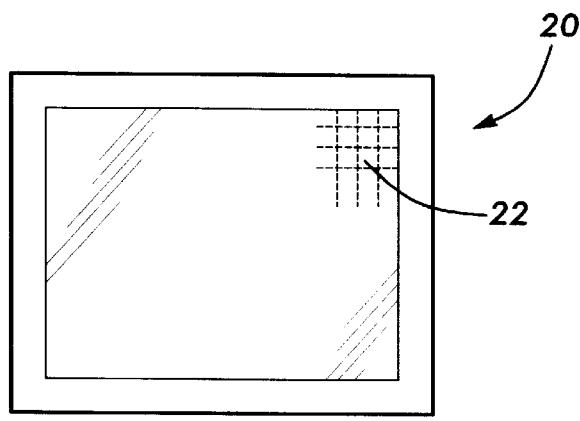
FIG. 1 is a diagrammatic illustration of a visual screen display.

FIG. 1 schematically illustrates a visual display screen 20 that includes a matrix of pixels 22. Those skilled in the art will appreciate that the pixels 22 illustrated in FIG. 1 are much larger than they would be in an actual embodiment and that only a few pixels are shown for illustration purposes only. The pixels 22 are arranged in a matrix of a plurality of rows and columns. Each pixel, therefore, has a row and column location or identifier on the screen 20.

Figure 2:
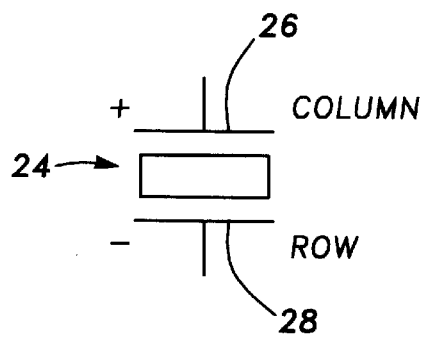
FIG. 2 is a schematic diagram illustrating a model of a pixel from the screen of FIG. 1.

Each pixel 22 can be modeled or represented by a capacitor. FIG. 2 illustrates a capacitor 24 having a top plate 26 and a bottom plate 28. The capacitor 24 is a model for a screen pixel 22. The total voltage on the capacitor 24, which is equal to the difference between the voltages on the plate 26 and the plate 28, determines the brightness of the pixel. Accordingly, the entire screen 20 can be modeled by a matrix of capacitors 24, each having a voltage that determines the brightness of that particular pixel.

The capacitor further serves as a good illustration of a screen pixel because, as mentioned above, each pixel has a row and column location. In screen displays such as electroluminescent displays, each pixel is controlled by two voltages; a row voltage and a column voltage. In the illustration of FIG. 2, the voltage on the plate 26 corresponds to a column voltage and the voltage on the plate 28 corresponds to a row voltage of each pixel.

Figure 3:
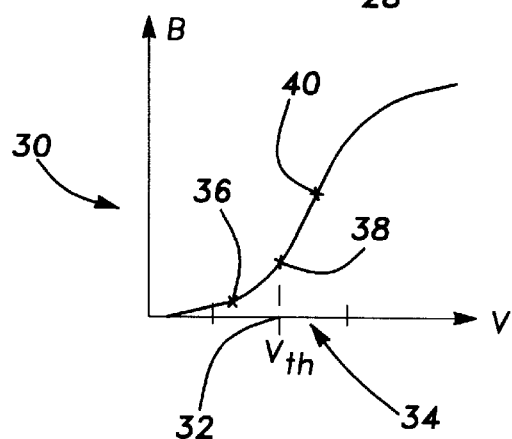
FIG. 3 is a graphical illustration of the relationship between screen brightness and voltage.

FIG. 3 is a graphical illustration 30 of a relationship between screen brightness and the voltage of each pixel. A threshold voltage 32 preferably is within the range from approximately 120 volts to about 160 volts. As can be appreciated from the illustrated curve, as the total voltage on each pixel increases, the brightness of the screen increases. Accordingly, the brightness of the screen can be controlled by adjusting the voltage on each pixel.

The method of this invention includes controlling the brightness of the screen by adjusting the row voltage of the screen pixels. Preferably, the row voltage is adjusted within a preselected range 34. The column voltage is preferably maintained at a preselected value. Since the column voltage is constant, adjusting the row voltage changes the total voltage on the pixels.

The row voltage preferably is adjusted or changed to a different value for daytime, twilight and nighttime conditions. Although it is presently preferred to have preselected voltages for each of the three mentioned conditions, it is within the scope of this invention to permit the row voltage to be varied to any value within a range such as the range 34. In FIG. 3, the voltage value 36 corresponds to a preferred total pixel voltage during nighttime conditions. Similarly, the voltage 38, which equals the threshold voltage, is a preferred total pixel voltage for twilight conditions and the voltage 40 is a preferred total pixel voltage for daytime conditions. During the daytime, when the ambient light is typically more intense, the screen must be brighter in order to be seen, compared to nighttime conditions when a lower brightness level would be acceptable.

Figure 4:
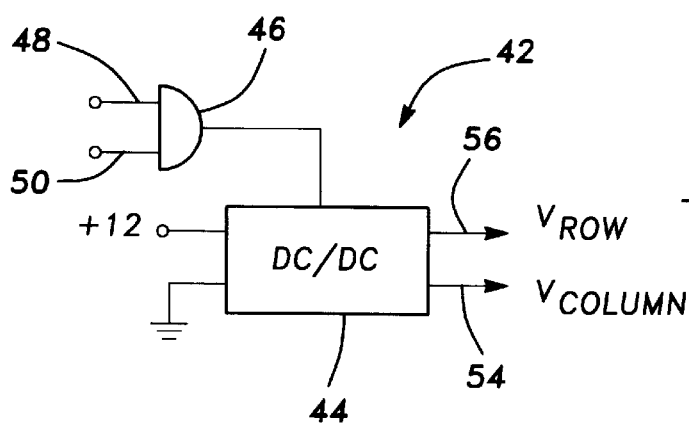
FIG. 4 is a schematic diagram of the preferred circuitry for implementing the method of this invention.

FIG. 4 schematically illustrates a circuit 42 designed according to this invention. The circuit 42 includes a circuit block 44 having a DC/DC converter with a feedback input that is coupled with to an OR gate 46. The input 48 to OR gate 46 preferably is coupled to a light-sensitive sensor that is capable of detecting the amount of ambient light in the general vicinity of the display screen. The input 50 to the OR gate 46 preferably is coupled to a manually controllable adjustment switch or knob that allows a user to select the screen brightness level depending on the ambient light. For example, the control coupled to the input 50 can be a rotary knob having three settings; one corresponding to daytime, one corresponding to twilight and a third corresponding to nighttime conditions. Either the sensor 48 or the control 50 produces a signal indicative of the ambient light conditions.

The DC/DC converter of circuit block 44 produces a constant column voltage at the output 54. The row voltage for the pixels is produced along the output 56. The row voltage is varied depending on the input from the sensor 48 or the control 50. The circuit block 44 preferably includes software or dedicated circuitry for comparing the current row voltage on the output 56 with a desired row voltage that corresponds to the ambient light condition as determined by the sensor 48 or the control 50. When the current row voltage is not the same as a desired row voltage, given the ambient light conditions, the DC/DC converter 44 changes the row voltage so that it is equal to the desired voltage. Therefore, the total voltage on the screen pixels is changed and the screen brightness is adjusted according to the ambient light conditions.

Figure 5:
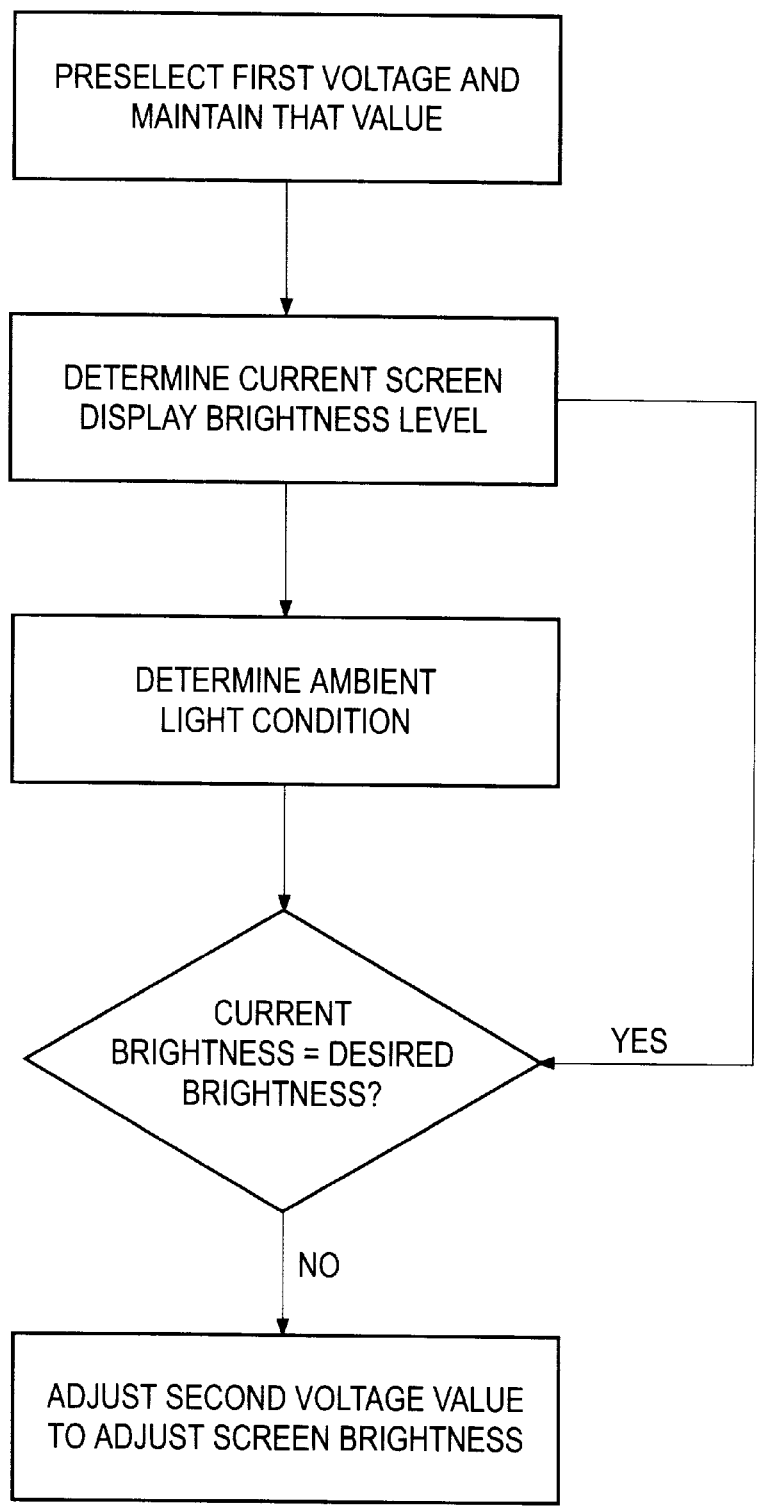
FIG. 5 is a flow chart diagram illustrating method steps of this invention.

Those skilled in the art will realize that a variety of photo-sensitive sensors are commercially available for accomplishing the purposes described above. Further, the circuit 42 is intended as a schematic example of one embodiment of circuitry for accomplishing the method of this invention. Those skilled in the art will realize that a variety of circuit components and/or microprocessors are commercially available for accomplishing the method of this invention. The method of this invention is illustrated in flow chart diagram form in FIG. 5.

The foregoing description is exemplary rather than limiting in nature. Variations and modifications to the disclosed embodiment will become apparent to those skilled in the art that do not necessarily depart from the purview and spirit of this invention. Accordingly, the legal scope of this invention can only be determined by studying the appended claims.

What is claimed is:

1. A method of controlling the brightness level overall of a screen display having a matrix of screen pixels that each have an individual brightness level controlled by a first and second voltage value, comprising the steps of (A) maintaining the first voltage applied to columns of all of the pixels at a preselected voltage value;

(B) determining a current screen display brightness level;

(C) determining which one of a plurality of discrete ambient light conditions is currently in effect, wherein each of the plurality of ambient light conditions has a single desired brightness level corresponding thereto;

(D) comparing the current brightness level from step (B) with the desired brightness level corresponding to the ambient light condition from step (C); and (E) adjusting the second voltage applied to a row each of pixel to a value corresponding to the desired brightness level from step (D) when the current brightness level does not correspond to the desired brightness level from step (D) to thereby adjust the current brightness level of the screen display so that it corresponds to the desired brightness level.

2. The method of claim 1, wherein step (B) is performed by determining the current second voltage level of the screen pixels.

3. The method of claim 2, wherein step (D) is performed by comparing the current second voltage level of the screen pixels to a desired second voltage level associated with the desired brightness level.

4. The method of claim 3, wherein step (E) is performed by changing the current second voltage level to the desired second voltage level when the current second voltage level is not equal to the desired second voltage level.

5. The method of claim 1, wherein step (C) is performed by detecting ambient light intensity in an area near and exterior to the screen using a sensor that is responsive to ambient light intensity.

6. The method of claim 5, wherein the sensor produces a first signal that corresponds to a daytime desired second voltage when the ambient light condition corresponds to a daytime condition and a second signal that corresponds to a nighttime desired second voltage when the ambient light condition corresponds to a nighttime condition.

7. The method of claim 1, wherein step (C) is performed by a user manually manipulating a control to a condition corresponding to the ambient light condition as perceived by the user.

8. The method of claim 7, wherein the control produces a first signal that corresponds to a daytime desired second voltage when the ambient light condition corresponds to a daytime condition and a second signal that corresponds to a nighttime desired second voltage when the ambient light condition corresponds to a nighttime condition.

9. The method of claim 8, wherein step (B) is performed by determining a current second voltage level of the screen pixels and wherein step (D) is performed by comparing the current second voltage level of the screen pixels to the desired second voltage corresponding to the signal produced by the control.

10. The method of claim 9, wherein step (E) is performed by changing the current second voltage level to the desired second voltage when the current second voltage level is not equal to the desired second voltage level.

11. The method of claim 1, wherein the matrix of screen pixels are arranged in a plurality of columns and rows and wherein the first voltage of each pixel is a column voltage and the second voltage of each pixel is a row voltage.

12. The method of claim 1, wherein a difference between the first and second voltage levels defines a total voltage level for each pixel and wherein step (A) is performed by determining a range of second voltage levels within which the second voltage level varies depending on the desired brightness level and selecting the first voltage level such that the total voltage level for each pixel is greater than a threshold voltage level where the screen display has a minimum acceptable brightness level, using the determined range of second voltage levels.

13. The method of claim 1, wherein the plurality of discrete ambient light conditions includes an ambient light condition for daytime, an ambient light condition for twilight and an ambient light condition for nighttime.

14. The method of claim 1, wherein the plurality of discrete ambient light conditions includes only an ambient light condition for daytime, an ambient light condition for twilight and an ambient light condition for nighttime.

* * * * *